Patented Nov. 13, 1951

2,574,516

UNITED STATES PATENT OFFICE 2,574,516

UNSATURATED ALIPHATIC PHOSPHONAMIDES

George E. Walter, Baltimore, Irwin Hornstein, East Riverdale, and George M. Steinberg, Baltimore, Md., assignors to The Glenn L. Martin Company, Middle River, Md., a corporation of Maryland No Drawing. Application November 26, 1948, Serial No. 62,234

6 Claims. (Cl. 260—461)

This invention relates to new compositions of matter and to their production. More specifically, the invention relates to unsaturated aliphatic phosphonamide derivatives as new compositions of matter. These compounds are proposed for use in a variety of fields, for example, for use as flameproofing agents, plasticizers, waterproofing agents, coatings, lubricating oil modifiers, hydraulic fluid modifiers, corrosion inhibitors, insecticides, fungicides, and many others.

It is an object of this invention to prepare unsaturated aliphatic phosphonamide derivatives.

It is a further object of this invention to prepare compositions of matter containing phosphorus and nitrogen in the molecule, the nitrogen being present as a substituted or unsubstituted phosphonamide.

Other and further objects of this invention will be apparent to those skilled in the art.

The new compositions of matter contemplated by this invention are those unsaturated aliphatic phosphonamide derivatives having the following formula:

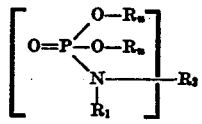

where $R_u$ represents an unsaturated aliphatic radical having from 3 to 5 carbon atoms and selected from the class consisting of alkenyl and alkynyl radicals; $R_1$ is selected from the class consisting of hydrogen, an alkyl radical having from 1 to 3 carbon atoms, an hydroxyalkyl radical having from 1 to 3 carbon atoms, and an unsaturated aliphatic radical having from 3 to 5 carbon atoms and selected from the class consisting of alkenyl and alkynyl radicals; and $R_2$ is selected from the class consisting of hydrogen, an unsaturated aliphatic radical having from 3 to 5 carbon atoms and selected from the class consisting of alkenyl and alkynyl radicals, and X, where X represents

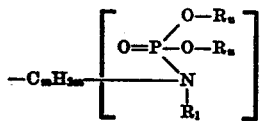

and in which $m$ is a small whole integer and $R_1$ and $R_u$ have the same meanings as before.

Specific examples of such compounds are diallyl phosphonamide, N-methylol diallyl phosphonamide, N-N' methylene bis diallyl amido phosphate, N-allyl diallyl phosphonamide, N-diallyl diallyl phosphonamide, N-N' ethylene bis diallyl amido phosphate, and dipropargyl phosphonamide. These compounds can be prepared in two ways; one consists in preparing the monochloro phosphate, e. g.,

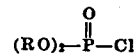

and converting this to the amide using ammonia, or a primary or secondary amine. The other method consists in preparing the dialkene phosphite

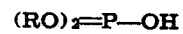

and converting this to the amide, using ammonia, or a primary or secondary amine in the presence of carbon tetrachloride.

The following examples illustrate suitable ways for preparing the unsaturated aliphatic phosphonamide derivatives of our invention.

EXAMPLE I

*Preparation of diallyl phosphonamide*

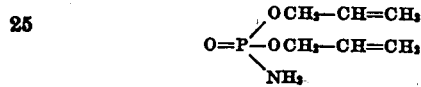

In a 3-neck flask provided with mechanical agitation and external cooling are placed 116 parts of allyl alcohol, 116 parts of toluene, and 182 parts of pyridine. Keeping the temperature at −20° C. to −30° C., 153 parts of phosphorus oxychloride are added over a period of 3 hours. The temperature is raised to 0° C. and the granular precipitate of pyridine hydrochloride is filtered off. The diallyl phosphoryl chloride is vacuum distilled and dissolved in toluene. Anhydrous ammonia gas is bubbled through the solution until alkaline. Ammonium chloride is filtered off, and the toluene evaporated from the filtrate. The residue is diallyl phosphonamide.

EXAMPLE II

*Preparation of diallyl phosphonamide: Preparation of diallyl phosphite; its isolation and conversion to amide*

1.

2.

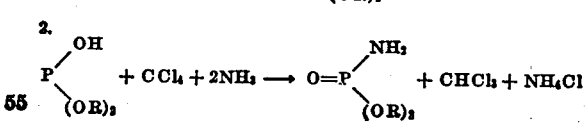

In a 3-neck flask equipped with dropping funnel, stirrer, and drying tube are placed 174 parts of allyl alcohol and an equal volume of toluene. The reaction flask is cooled to −20° to −30° C. 137.5 parts of phosphorus trichloride in 70 parts of toluene are added, the rate of addition being such as to keep the temperature between −20° and −30° C. This is maintained at −20° C. for 1½ hours; and dry air is passed through for another 1½ hours to remove hydrogen chloride. The temperature is then raised to 0° C. To remove all of the hydrogen chloride, anhydrous ammonia is passed through, keeping the temperature at 0° C. The ammonium chloride formed is removed by filtration.

The filtrate is distilled under vacuum. Before distilling the phosphite, about .1 part of hydroquinone is added to avoid any violent polymerization on heating. The diallyl phosphite is obtained at 80° C. and 2 mm of mercury. The yield is high. 162 parts of diallyl phosphite in 154 parts of carbon tetrachloride are diluted with 350 parts of carbon tetrachloride or benzene or toluene, etc., and cooled to −15° to −20° C. Anhydrous ammonia gas is passed through with good stirring until the solution is alkaline. The precipitated ammonium chloride is filtered off, and the residue, vacuum distilled. Choroform and solvent are removed at room temperature; i. e., a temperature no higher than 40° C. The residue is diallyl phosphonamide having a melting point temperature of 12° to 14° C.

EXAMPLE III

Direct preparation of diallyl phosphonamide

To 174 parts of allyl alcohol in 400 parts of carbon tetrachloride are added at −20° to −30° C. 137.5 parts of phosphorus trichloride in 100 parts of carbon tetrachloride. The rate of addition is such as to maintain the above temperature. The flask is kept at −20° C. for 1½ hours, and dry air is blown through to remove dissolved hydrogen chloride for another 1½ hours. Maintaining the temperature at −10° to 20° C., anhydrous ammonia is passed through with vigorous stirring. This removes residual hydrogen chloride and converts the phosphite formed directly to the amide. The reaction is complete when further addition of ammonia does not tend to raise the temperature.

The precipitated ammonium chloride is filtered off and the filtrate vacuum distilled. Chloroform and carbon tetrachloride are removed. The residue is essentially the phosphonamide. We have found it advisable to purify the product by distillation. The amide distills at 130° C. at 2 mm. of mercury.

EXAMPLE IV

Preparation of N-methylol diallyl phosphonamide

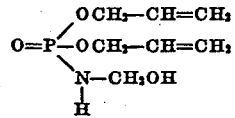

177 parts of the diallyl phosphonamide prepared as in Examples I, II, or III are dissolved in 85 parts of commercial 40 per cent formaldehyde solution. The solution is allowed to stand for 48 hours at room temperature at which time the reaction is complete. Water and methanol are removed by vacuum distillation, and the residual water-insoluble oily liquid is neutralized and dried. The methylol compound cannot be crystallized even at −40° C. and is readily polymerizable.

EXAMPLE V

Preparation of N-N' methylene bis diallyl amido phosphate

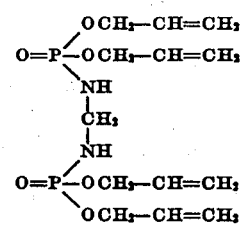

To 207 parts of the N-methylol diallyl phosphonamide as prepared in Example IV add 177 parts of the diallyl amido phosphate. The mixture is allowed to stand for 48 hours at room temperature to insure complete reaction. The water formed is removed by vacuum distillation. The residue is a water insoluble solid material and readily polymerizable.

To 177 parts of the diallyl phosphonamide prepared as in Examples I, II, or III add 15 parts of formaldehyde by using an appropriate amount of commercial 40 per cent formaldehyde solution. (The exact concentration of formaldehyde in the commercial product should be determined by analysis.) The solution is allowed to stand for 48 hours at room temperature to insure completeness of reaction. Water and methanol are removed by vacuum distillation, and the residual water insoluble solid material is dissolved in benzene and neutralized. The benzene is removed by distillation, and the solid is then dried over sulfuric acid.

EXAMPLE VI

Preparation of N-allyl diallyl phosphonamide

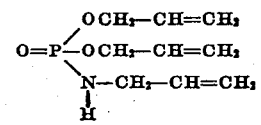

To 162 parts of diallyl phosphite in 300 parts of carbon tetrachloride add 114 parts of allyl amine drop-wise with stirring, keeping the temperature at about 10° to 20° C. Let stand for one to two hours with stirring. Allyl amine hydrochloride formed in the reaction is filtered off. The carbon tetrachloride is removed by distillation, and N-allyl diallyl phosphonamide is recovered by vacuum distillation. The N-allyl diallyl phosphonamide at 2 mm. of mercury boils at 115° to 120° C.

EXAMPLE VII

Preparation of N-diallyl diallyl phosphonamide

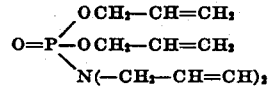

To 162 parts of diallyl phosphite in 300 parts of carbon tetrachloride add 196 parts of diallyl amine drop-wise with stirring, keeping the temperature at about 10° to 20° C. Let stand for one to two hours with stirring. Diallyl amine hydrochloride formed in the reaction is filtered off.

The carbon tetrachloride is removed by distillation, and N-diallyl diallyl phosphonamide is recovered by vacuum distillation. The N-diallyl diallyl phosphonamide at 2 mm. of mercury boils at 105° to 110° C.

EXAMPLE VIII

*Preparation of N-N' ethylene bis diallyl amido phosphate*

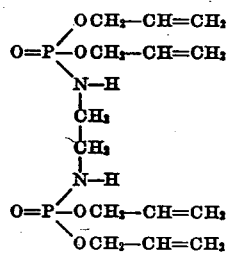

To 162 parts of diallyl phosphite in 300 parts of carbon tetrachloride add 60 parts of ethylene diamine drop-wise with stirring, keeping the temperature at about 10° to 20° C. This is allowed to stand for one to two hours with stirring. Ethylene diamine hydrochloride formed in the reaction is filtered off. The carbon tetrachloride is removed by distillation, and the N-N' ethylene bis diallyl amido phosphate in quantitative yield remains behind. The material is a solid, having a melting point temperature of 35° to 36° C.

EXAMPLE IX

*Preparaton of dipropargyl phosphonamide*

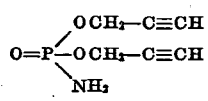

At —20° C. 168 parts of propargyl alcohol are reacted with 137.5 parts of phosphorus trichloride in 500 parts of carbon tetrachloride. The phosphorus trichloride is added drop-wise. Dry air is then blown through the reaction mixture for 1½ hours, to remove most of the hydrogen chloride formed. The temperature is maintained at 10° to 20° C., and anhydrous ammonia is passed through, forming the amide and neutralizing the residual acid.

The propargyl phosphonamide and ammonium chloride form an insoluble layer in the carbon tetrachloride. The carbon tetrachloride layer is evaporated, leaving a small residue of the amide. The propargyl amide can be separated from ammonium chloride by heating slightly and filtering off the ammonium chloride. The melting point temperature was 35° C., and the amide can be distilled at 2 mm. of mercury at 155° to 160° C.

Because of the unsaturation of these compounds, they may be readily used as monomers or comonomers for polymerization reactions. The more complex molecules, such as N-N' methylene bis amido diallyl phosphate, and particularly N-N' ethylene bis amido diallyl phosphate which contain four active double bonds, will result in highly branched polymers which are suitable for a wide variety of uses.

Films produced from these polymers are much less thermoplastic and have higher softening points than polymers produced from the simpler monomer molecules.

Further, substituting an alkyl group of at least two carbon atoms for one of the hydrogen atoms on the amido group increases alkali resistance immensely, making compounds so produced particularly effective and permanent, flameproofing agents for textiles. All of the above-described compounds have been found to impart flameproofing characteristics to textiles.

It is to be understood that certain changes, alterations, modifications, and substitutions can be made without departing from the spirit and scope of the appended claims.

We claim as our invention:

1. As new compositions of matter, unsaturated aliphatic phosphonamide derivatives having the formula

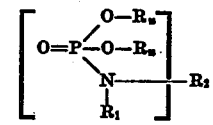

where $R_u$ represents an unsaturated aliphatic radical having from 3 to 5 carbon atoms and selected from the class consisting of alkenyl and alkynyl radicals; $R_1$ is selected from the class consisting of hydrogen, an alkyl radical having from 1 to 3 carbon atoms, an hydroxylalkyl radical having from 1 to 3 carbon atoms, and an unsaturated aliphatic radical having from 3 to 5 carbon atoms and selected from the class consisting of alkenyl and alkynyl radicals; and $R_2$ is selected from the class consisting of hydrogen, an unsaturated aliphatic radical having from 3 to 5 carbon atoms and selected from the class consisting of alkenyl and alkynyl radicals, and X, where X represents

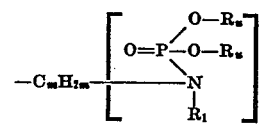

and in which $m$ is a small whole integer and $R_1$ and $R_u$ have the same meanings as before.

2. As a new composition of matter, diallyl phosphonamide having the formula

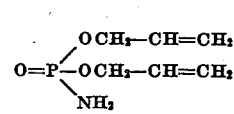

3. As a new composition of matter, N-methylol diallyl phosphonamide having the formula

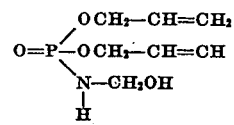

4. As a new composition of matter, N-allyl diallyl phosphonamide having the formula

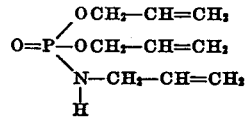

5. As a new composition of matter, N-diallyl diallyl phosphonamide having the formula

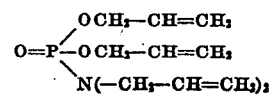

6. As a new composition of matter, dipropargyl phosphonamide having the formula

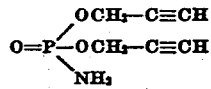

GEORGE E. WALTER.
IRWIN HORNSTEIN.
GEORGE M. STEINBERG.

REFERENCES CITED

The following references are of record in the file of this patent:

UNITED STATES PATENTS

| Number | Name | Date |
| --- | --- | --- |
| 2,151,380 | Flint et al. | Mar. 21, 1939 |
| 2,394,829 | Whitehill et al. | Feb. 12, 1946 |

OTHER REFERENCES

Atherton et al.: "Jour. Chem. Soc. (London)," 1945, pages 660–663.

Zetsche et al.: "Ber. deutsch. chem. Ges.," vol. 73B (1940), pp. 47–49.